March 27, 1934.     A. T. YATES     1,952,961
SHEARING MACHINE AND PROCESS OF SHEARING
Filed Oct. 19, 1931     2 Sheets-Sheet 1
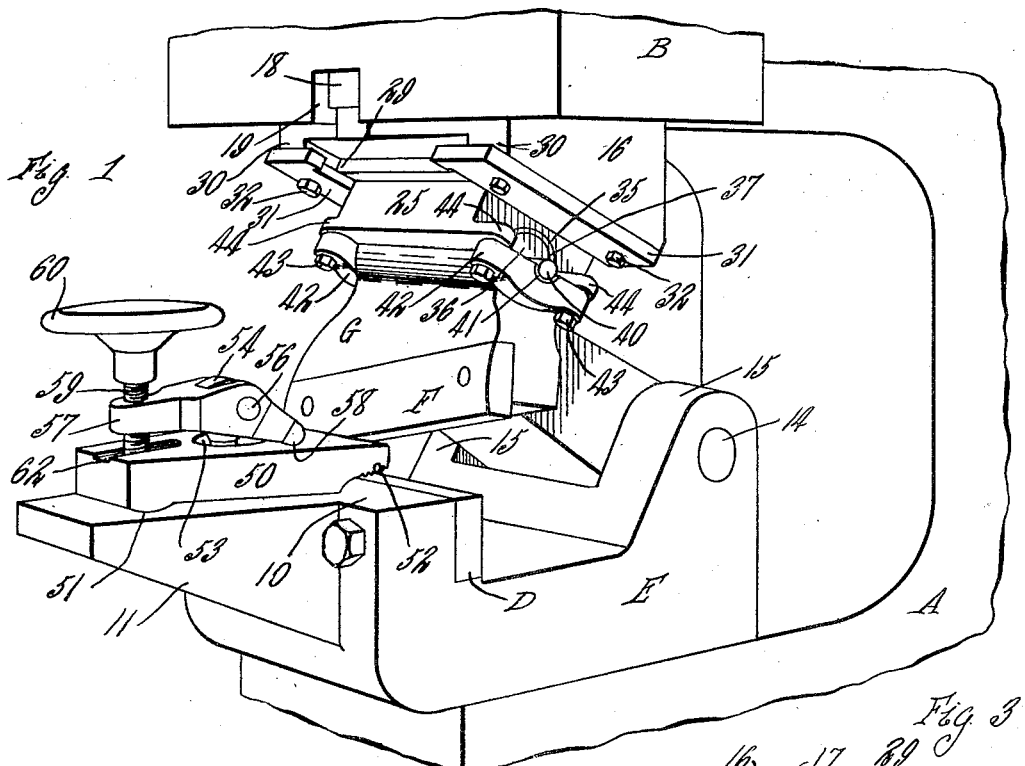
INVENTOR
Arthur T. Yates
by Parker & Prochnow
ATTORNEYS March 27, 1934.  A. T. YATES  1,952,961
SHEARING MACHINE AND PROCESS OF SHEARING
Filed Oct. 19, 1931   2 Sheets-Sheet 2
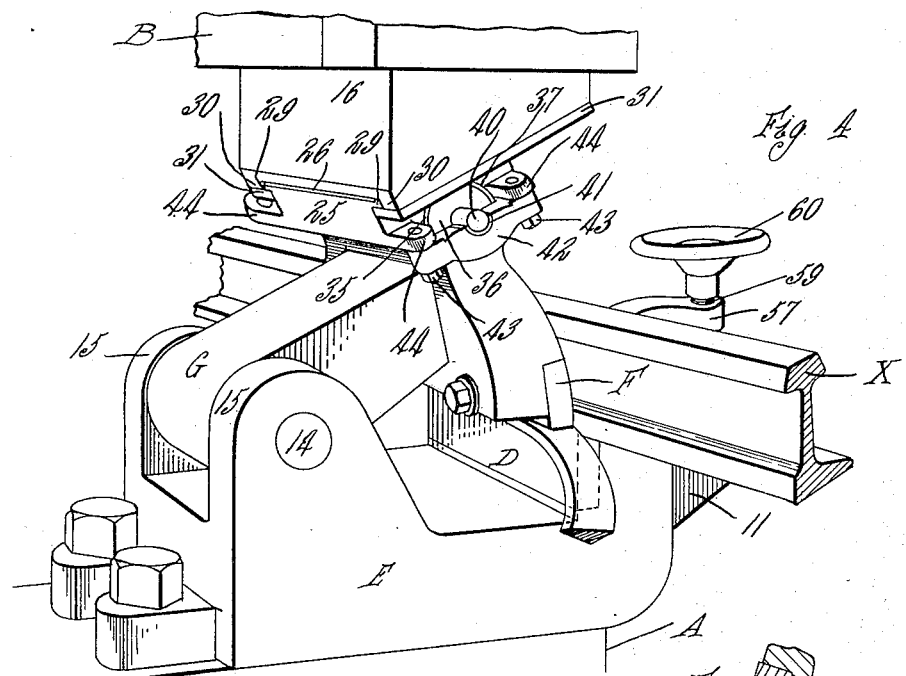
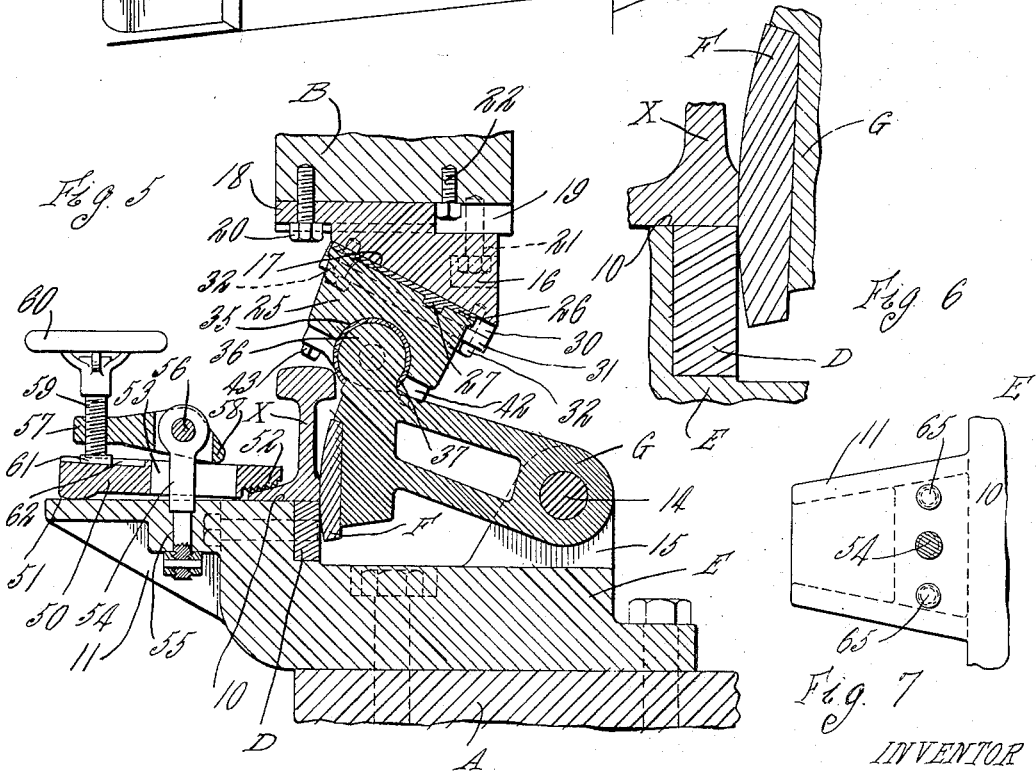
INVENTOR
Arthur T. Yates
by Parker & Brocknow
ATTORNEYS Patented Mar. 27, 1934

1,952,961

UNITED STATES PATENT OFFICE 1,952,961

SHEARING MACHINE AND PROCESS OF SHEARING

Arthur T. Yates, West Seneca, N. Y., assignor to Buffalo Forge Company, Buffalo, N. Y.

Application October 19, 1931, Serial No. 569,687

4 Claims. (Cl. 164—43)

This invention relates to improvements in metal shearing machines and in processes of shearing.

The objects of this invention are to provide a method of shearing and a shearing machine in which the movable knife or cutting member will, during its cutting stroke, move laterally under an overhanging flange or part of the work as well as downwardly; also to provide an apparatus of this kind in which the movable cutting member tends to move away from the fixed cutting member after completing the cut; also to provide a machine of this kind in which the part of the work which is cut away and which is engaged by the movable member will be moved away from the fixed cutting member to avoid the friction of the cut part against the fixed cutting member; also to provide an improved method of shearing metal in accordance with which the movable cutting member is guided so as to move away from the fixed member after severing the work; also to provide a method and machine in which a movable cutting member having a substantially helical cutting edge, is guided to move about an axis, so that a portion only of the movable member is in cutting relation to the work at one time and so that each portion of the movable member, after completing the cutting operation, moves away from the fixed cutting member; also to provide in a cutting machine an improved work holder or stripping member; also to improve methods and apparatus of this kind in other respects hereinafter specified.

In the accompanying drawings:

Fig. 1 is a fragmentary perspective view of a shearing machine having applied thereto a cutting mechanism embodying this invention;

Fig. 2 is a side elevation thereof;

Fig. 3 is a fragmentary section thereof, on an enlarged scale, on line 3—3, Fig. 2.

Fig. 4 is a perspective view of the shearing machine showing the same shearing a flange from a rail.

Fig. 5 is a longitudinal, central, sectional elevation of the machine.

Fig. 6 is a fragmentary, sectional view showing the position of the cutting members after the completion of the cut.

Fig. 7 is a fragmentary plan view of the means for forcing the clamping jaw of the work holder away from the work.

This invention may be applied to a shearing machine of any desired construction, and only that portion of the shearing machine to which this invention applies is shown in the accompanying drawings, in which A represents a part of the fixed frame of the machine, having the usual guide (not shown) in which a plunger or ram B may move vertically. The portion of the shearing machine shown is that having the usual recess in the frame A in which the cutting members are arranged.

D represents the lower or fixed cutting member or knife of the machine, which is arranged on a suitable holder or base E secured to the frame A of the machine. This base or holder also includes a work supporting surface 10 on which the work to be cut may be clamped or otherwise secured during the shearing operation, the upper edge of the knife D in the construction shown, constituting a continuation of the work supporting surface 10. The base E also has a forwardly extending bracket or projection 11 upon which suitable means may be arranged to secure the work on the work supporting surface, which means will be described later.

In order to enable the machine to operate on work having a flange or other part extending over the portion of the work to be cut, the movable shearing member, instead of moving straight up and down, as has heretofore been customary, is caused to move in a path of movement such that this member moves first downwardly and laterally toward the work, then straight downwardly through the work, and finally downwardly and laterally away from the work. In order to guide the movable cutting member or knife F in a path of movement of this kind, in the particular construction illustrated in the drawings, the cutting member is mounted upon a pivoted holder G having one end thereof pivoted on a rod or shaft 14 having its axis substantially parallel to the cutting edge of the fixed or straight knife D, and substantially in the same plane as the work supporting surface 10. The shaft 14 may be mounted on any suitable fixed part of the machine, and in the construction shown, the base E is provided with upwardly extending lugs 15 provided with holes which receive the ends of the pivot shaft 14.

The result of this arrangement is that the movable cutting member or knife F, in moving downwardly into cutting position, will also move laterally toward the work, and then straight downwardly through the work, and after passing through the work, will again move downwardly and laterally away from the work and from the fixed cutting member D. When the work, as shown in the drawings, is in the form of a rail, the portion of the lower flange of which is to be cut away, for example, as is necessary in making guard rails for curves or switches, the movable cutting member will move about an arc of a circle into a cutting position underneath the upper flange or head of the rail. This arrangement of the movable cutting member also results in another advantage, in that after the cutting member or any portion thereof has completed the cut, it then moves away from the lower cutting member, as is clearly shown in Figs. 5 and 6. This has the advantage of preventing friction and wear between the two cutting members and the further advantage that the movable cutting member in moving laterally away from the work, will frictionally draw away from the lower knife the portion of the work which has been cut, thus reducing the amount of power required to operate the shearing machine by avoiding the friction between the part of the work which has been cut away and the lower knife.

Preferably, the movable knife or cutting member F is inclined with reference to the fixed cutting member D, so that only a portion of an entire cut is made at a time and in the construction shown, see particularly Fig. 1, the movable cutting member F has its lower cutting edge inclined with reference to the cutting edge of the fixed cutting member D, and in order to obtain the best results, the outer surface of the movable cutting member F is curved like a portion of a cylinder having the center of the pivot shaft 14 as its axis. The lower cutting edge of the movable cutting member will, therefore, be helical in form.

The holder G of the movable cutting member may be swung back and forth about the pivot shaft 14 in any suitable or desired manner. In the particular construction shown, this movement is imparted to the holder G by means of the reciprocatory plunger B. Any suitable means for transmitting this movement from the plunger to the movable holder G may be employed. In the particular machine shown, a block 16, having a lower inclined face 17, is preferably secured to the lower end of the plunger B, and for this purpose, the block 16 may have a part 18 adapted to enter into a groove 19 usually provided in the lower face of the plunger B and bolts 20 and 21 may be employed for holding or securing the block to the plunger. A screw stud 22 is preferably secured in the recess 19 in the lower end of the plunger, in position to engage the rear end of the projection 18 to form additional securing means for holding the block 16 from sliding backwardly relatively to the plunger during the cutting operation.

The inclined face 17 of the block 16 is preferably finished to form an extended bearing surface on which a connecting block or member 25 may slide, which connecting member forms a connection between the vertically moving plunger B through the block 16 secured to the plunger, and the pivotally mounted holder G for the cutting member. For this purpose, the connecting member 25 may be provided with a pad or bearing plate 26 contacting with and slidable on the bearing surface 17 and secured to the connecting block 25 in any suitable manner, for example, by means of a key 27 shown in Fig. 5. The connecting member 25 preferably also has flanges 29 extending toward opposite sides thereof. The block 16 is provided at opposite sides with extensions 30 engaging the opposite sides of the flanges 29 (see Fig. 3), and retaining plates 31 suitably secured to the extensions 30, for example, by means of bolts 32 engaging the lower surfaces of the flanges 29. This structure restricts the connecting member to move only lengthwise of the machine on the face 17 of the block 16.

The connecting member 25 is preferably provided with a semi-cylindrical bearing recess 35 extending crosswise thereof. The tool holder G is provided with a corresponding partly cylindrical portion 36 adapted to fit into the bearing recess, and if desired, a correspondingly curved bearing bushing 37 may interpose between the cylindrical portion 36 of the upper knife holder and the cylindrical recess 35 of the connecting member. The upper knife holder G preferably also has bearing studs or trunnions 40 extending laterally beyond each end of the cylindrical part 36, and these studs may bear in substantially semi-cylindrical recesses 41 in bearing members 42 suitably secured to the connection member 25. For example, these bearing members may be secured by means of bolts 43 to lugs 44 extending laterally from the opposite sides of the connecting member 25. These studs 40 and the bearing members 42 serve to raise the tool holder G during the upward movement of the plunger B, while the larger cylindrical bearing member 36, cooperating with the bearing surface 35, transmits the downward pressure of the plunger B to the tool holder G. Since the cylindrical portion 36 of the tool holder G moves about the axis of the pivot shaft 14 while the plunger B moves vertically, the difference in movement of these two parts is compensated for by a sliding of the connecting member 25 with reference to the inclined block 16.

The construction described for imparting movement to the pivoted knife holder G from the reciprocatory plunger B has the advantage that extended bearing surfaces are provided both at the sliding connection along the inclined face 17 of the block 16 and along the cylindrical surfaces 35 and 36, so that the extremely heavy pressures can be transmitted from the plunger to the knife holder G without damage to the bearings connecting these two members. By making the face 17 inclined in the direction shown, it will be clear that the tendency of the connecting member 25 to bind against the inclined face 17 is reduced to a minimum, so that the friction between these two surfaces will not result in unduly great strains on the pivotal connection between the connecting member 25 and tool holder G, nor upon the pivotal axis 14 of the tool holder. Any other means may, however, be employed for transmitting power from the plunger to the pivoted knife holder G.

The movable cutting member moves about an arc of a circle and consequently, the movable member passes through the work on a slight arc, which, however, is of such small curvature that the cut is made substantially in a plane at right angles to the supporting surface for the work and the upper face of the stationary knife. In moving to the work, the cutting member moves laterally of the plane in which the shearing takes place toward this plane and enters into this plane approximately when engaging the work. After the cut is completed, the cutting member moves in a direction toward the same side of the plane in which the shearing takes place. By moving away from the shearing plane, the movable cutting member not only moves out of contact with the stationary cutting member, but also frictionally moves the portion of the work which is cut away from the portion of the work held on the stationary knife, thus eliminating the large amount of friction which heretofore resulted in cases in which the movable cutting member moved throughout its stroke in the plane of shearing, and consequently, it in no way tended to move the material cut by the movable member away from the fixed member. The operation of the movable cutting member further enables the same to make the cut in a lower flange or part of a member having a part overhanging the line of cut or intercepting the shearing plane.

Means of any suitable kind may be employed for gripping the work X, for holding the same on the work supporting surface 10, particularly during the upward movement of the cutting member F to prevent the dislodging of the work by the movable cutting member. In the particular construction employed for this purpose, a gripping clamp or member 50 is preferably provided, having one end thereof rounded, as shown at 51, to adapt the member to swing about this rounded end on the upper surface of the extension or bracket 11, and the other end of the clamp 50 is provided with a gripping face 52 adapted to engage a flange of the rail or other work which is being cut. The gripping clamp or member is preferably provided in the intermediate portion thereof with a longitudinal slot 53 through which a pivot member in the form of any eye bolt 54 extends. The lower end of this eye bolt is preferably swivelled in a hole 55 in the bracket or extension 11, as illustrated in Fig. 5, and the upper end of the eye bolt has a bearing pin 56 extending therethrough. This pin forms the fulcrum of a lever 57 one end 58 of which is adapted to bear down upon the upper surface of the gripping member 50 adjacent to the gripping or toothed face 52 thereof, and the other end of the lever 57 is provided with a screw threaded hole in which a clamping screw 59 engages. The upper end of the clamping screw is provided with a wheel or handle 60 for turning the same, and the lower end thereof is provided with an enlarged foot or bearing portion 61 adapted to bear downwardly on the clamping member 50 in a longitudinal shallow groove or recess 62 formed therein. It will be obvious that as the screw 59 is tightened, the clamping member 50 will be pressed downwardly toward the work supporting face 10 both by the lever action of the part 58 of the lever 57 and by the downward pressure of the screw 59. At the same time the clamping screw also presses the rounded part 51 downwardly against the upper face of the extension 11 of the machine and thus prevents the gripping clamp 50 from shifting along this face.

Since the bolt 54 is swivelled in the extension 11, the clamping device can be turned about said bolt so that the member 50 may be positioned in angular relation to the cutting members, thereby permitting its gripping face 52 to properly engage the flanges of rails, or other work which may be curved or bent in a horizontal direction.

When the clamping screw is released, it will be seen that the lower clamp 50 is free to be moved toward and from the work, being guided in this movement by the slot 53 and the groove 62 cooperating respectively with the swivelled bolt and the foot of the clamping screw.

The movement of the gripping member 50 away from the work may be facilitated, and the disengagement of the teeth 52 therefrom assured by the provision of spring pressed studs or members 65 arranged in pockets 66 in the extension 11 in a manner to engage the bottom face of said member 50 and urge the same upwardly when released, see Figs. 2 and 7. Any other suitable means may be provided for gripping the work and for releasing the gripping member, if desired.

The clamping mechanism described can thus be readily adjusted so as to be adapted for the work to be operated upon.

The device as illustrated in the drawings is designed for attachment to a shearing machine of common construction. It will be understood, however, that the device may be built as a part of the shearing machine, and if such a machine is constructed for operating on larger pieces of material, the pivot of the movable knife holder may be supported from above so that the material cut off may pass under the pivotal support for the movable tool holder.

While this invention is shown and described as used in connection with the shearing of a lower flange of a member having an upper flange extending over the part to be cut, yet it will be understood that it is not intended to limit the invention to use in connection with such work, since the invention may be advantageously applied to cutting of sheets, plates or other work having no part overhanging the portion to be cut. In operating on any kind of work, the method and apparatus has the advantage that the machine operates more efficiently and with less power and less wearing down of cutting members, than shearing machines heretofore built.

I claim as my invention:

1. An attachment for a shearing machine having a reciprocatory plunger, said attachment including a work support having a stationary cutting member mounted thereon, a movable cutting member, a holder for said movable cutting member pivotally mounted on said attachment at one side of said cutting member, and a part pivotally connected with said pivoted holder and adapted to be connected with said plunger for imparting pivotal movement to said holder from the reciprocatory movement of said plunger.

2. A shearing machine, including a reciprocatory plunger and a work supporting surface having a stationary cutting member secured thereto, said stationary cutting member having a substantially straight cutting edge, a holder for a movable cutting member, said holder being pivoted at one side of said cutting member to swing about an arc of a circle during its working stroke, a movable cutting member secured to said holder and having its cutting edge inclined with reference to the cutting edge of the fixed cutting member and having all portions of its cutting edge equidistant from the pivotal axis of said holder, and a connection between said plunger and said pivoted holder to move said holder about its pivot.

3. A shearing machine, including a reciprocatory plunger and a work supporting surface having a stationary cutting member secured thereto, said stationary cutting member having a substantially straight cutting edge, a holder for a movable cutting member, said holder being pivoted at one side of said cutting member to swing about an arc of a circle during its working stroke, a movable cutting member secured to said holder and having its outer surface nearest to said stationary cutting member lying substantially on the surface of a cylinder having its axis coincident with the pivotal axis of said holder, said movable cutting member having a helical cutting edge inclined with reference to the stationary cutting member.

4. A shearing machine having a fixed cutting member and a reciprocatory plunger, a movable cutting member adapted to cooperate with said fixed cutting member, a holder on which said movable cutting member is mounted and which is pivoted at one side of said fixed cutting member, and said holder causing said movable cutting member to swing about an arc of a circle during its cutting stroke, and a connecting member arranged to form a connection between said plunger and said pivoted holder and having a pivoted connection with said pivoted holder and a sliding connection with said plunger, said sliding connection being in a plane inclined with reference to the path of movement of said plunger and facing the portion of the work to be cut.

ARTHUR T. YATES.